United States Patent [19]
Takada et al.

[11] Patent Number: 5,490,125
[45] Date of Patent: Feb. 6, 1996

[54] RECORDING SYSTEM FOR A SINGALONG DISC PLAYER

[75] Inventors: Shinichi Takada; Haruhiko Kasuya; Masaya Ogawa, all of Saitama, Japan

[73] Assignee: Pioneer Electronic Corporation, Tokyo, Japan

[21] Appl. No.: 489,281

[22] Filed: Jun. 9, 1995

Related U.S. Application Data

[63] Continuation of Ser. No. 164,946, Dec. 10, 1993, abandoned.

[30] Foreign Application Priority Data

Dec. 14, 1992 [JP] Japan .................. 4-333314

[51] Int. Cl.⁶ .................................................. G11B 7/00
[52] U.S. Cl. .................. 369/54; 369/83; 369/4; 369/49
[58] Field of Search ........................ 369/47, 49, 84, 369/48, 54, 83, 4, 34, 58, 44.32; 360/18, 19.1; 84/609, 645

[56] References Cited

U.S. PATENT DOCUMENTS

| | | | |
|---|---|---|---|
| 4,839,879 | 6/1989 | Sawada et al. | 369/54 |
| 4,984,230 | 1/1991 | Satoh et al. | 369/54 |
| 5,056,402 | 10/1991 | Hikawa et al. | 84/645 |
| 5,231,239 | 7/1993 | Tsumura et al. | 84/609 |
| 5,237,553 | 8/1993 | Fukushima et al. | 369/47 |
| 5,295,126 | 3/1994 | Okano et al. | 369/47 |

FOREIGN PATENT DOCUMENTS

| | | |
|---|---|---|
| 072704 | 2/1983 | European Pat. Off. . |
| WO85/01382 | 3/1985 | WIPO . |

*Primary Examiner*—Nabil Z. Hindi
*Attorney, Agent, or Firm*—Nikaido, Marmelstein, Murray & Oram

[57] ABSTRACT

A recording device is provided for recording an accompaniment reproduced by a singalong disc player and a vocal part sang at the accompaniment on a recordable disc. A rerecording command during recording is detected for rerecording information on the recordable disc and for producing a rerecording signal. In response to the rerecording signal the recording the information is stopped, and an address of a recorded area of the disc is stored in a memory as an unnecessary area. In response to a restart signal, recording the information is restarted from an end of the unnecessary area. When the rerecording has been finished, the recordable disc is finalized such that the unnecessary area is not reproduced thereafter based on the stored address.

5 Claims, 5 Drawing Sheets

RECORDING SYSTEM FOR A SINGALONG DISC PLAYER

This application is a continuation-in-part of application Ser. No. 08/164,946 filed Dec. 10, 1993 now abandoned.

BACKGROUND OF THE INVENTION

The present invention relates to a recording system for a CD-R (CD-recordable), and DAT (digital audio tape), adapted to be operated together with a singalong disc player for playing a disc on which instrumental accompaniments of songs are recorded.

There has been a demand to record one's voice and the accompaniment thereof reproduced by the singalong disc player in order to listen to own voice. In a conventional recording system, the vocal and instrumental signals are mixed and recorded on a magnetic tape loaded on a cassette tape recorder. The recording system is manually operated to start the recording at a timing each time a song is sung. However, the manual operation is troublesome, and often ends in failure.

The applicant of the present invention has proposed in Japanese Patent Application 4-275852 a recording system which is operatively connected with a singalong disc player so as to automatically record audio data produced by the disc player.

In such a recording system, the singer, thinking that he did not start the song well enough, may want to restart the song from the beginning, or to sing another song. When recording on a write-once CD, since new information cannot be recorded over the old, the erroneous recording is left on the CD. Thus, when the recorded CD is played, the correct recording is heard only after the erroneous recording. In order to avoid such a problem, a new CD must be loaded when restarting, so that the old CD is wasted. Moreover, the operation for restarting the recording is complicated.

SUMMARY OF THE INVENTION

An object of the present invention is to provide a recording system which is arranged such that the area of the CD where the erroneous recording is stored is prevented from being reproduced.

According to the present invention, there is provided a recording system having a recording device for recording information fed from a singalong disc player on a recordable disc comprising, starting means responsive to a start signal for starting to record the information, detector means for detecting a rerecording command for rerecording the information on the recordable disc and for producing a rerecording signal, stopping means responsive to the rerecording signal for stopping the recording the information, storing means for storing an address of a recorded area of the disc in a memory as an unnecessary area.

The start means is responsive to a restart signal based on completion of the storing for restart to record the information from an end of the unnecessary area. When the rerecording has been finished, the recordable disc is finalized such that the unnecessary area is not reproduced thereafter based on the stored address.

Other objects and features of this invention will become understood from the following description with reference to the accompanying drawings.

DETAILED DESCRIPTION OF THE PREFERRED EMBODIMENT

Figure 1:
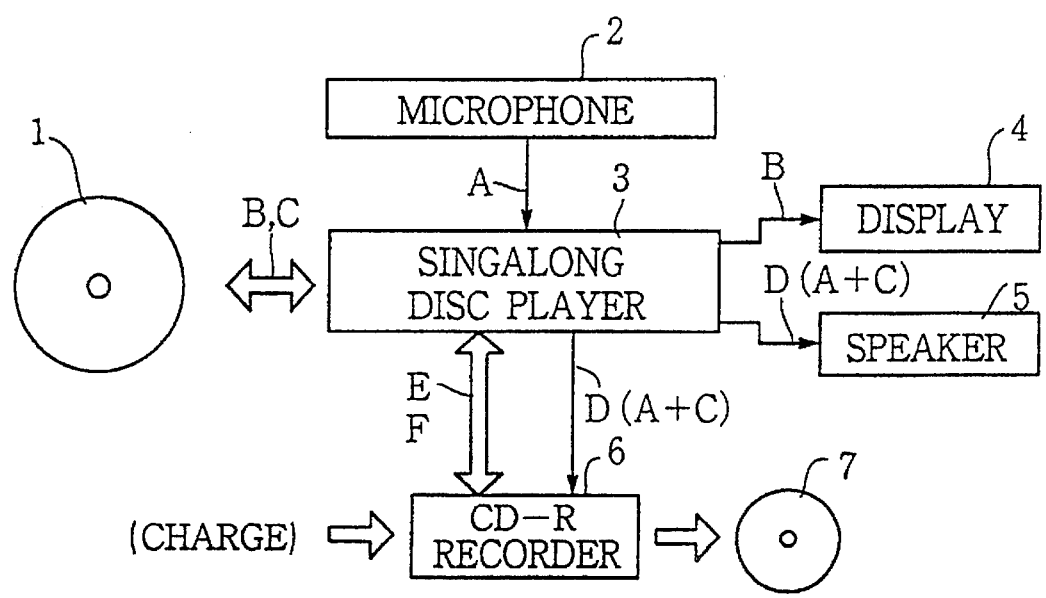
FIG. 1 is a schematic block diagram of a singalong disc player system provided with a CD-R recorder according to the present invention.

Referring to FIG. 1, a singalong disc player 3 to which the present invention is applied reads recorded data on a singalong disc 1 and reproduces audio signals C representing instrumental accompaniments of songs and a video signal B representing pictorial images appropriate for each song.

A vocal signal A picked up by a microphone 2 is fed to the disc player 3 and mixed with the reproduced audio signal. The mixed audio signal D (A+C) is amplified and fed to a speaker 5. The video signal B, after an appropriate signal processing, is applied to a CRT display 4.

The mixed audio signal D is further fed to a compact disc-recordable (CD-R) recorder 6 wherein the mixed signal, that is the vocal part and the accompaniment part of a song, is recorded on a write-once CD-R 7. The CD-R recorder 6 may be provided with a charge receiving device so that the CD-R recorder is operated to record a CD-R when a predetermined charge is paid.

Figure 2:
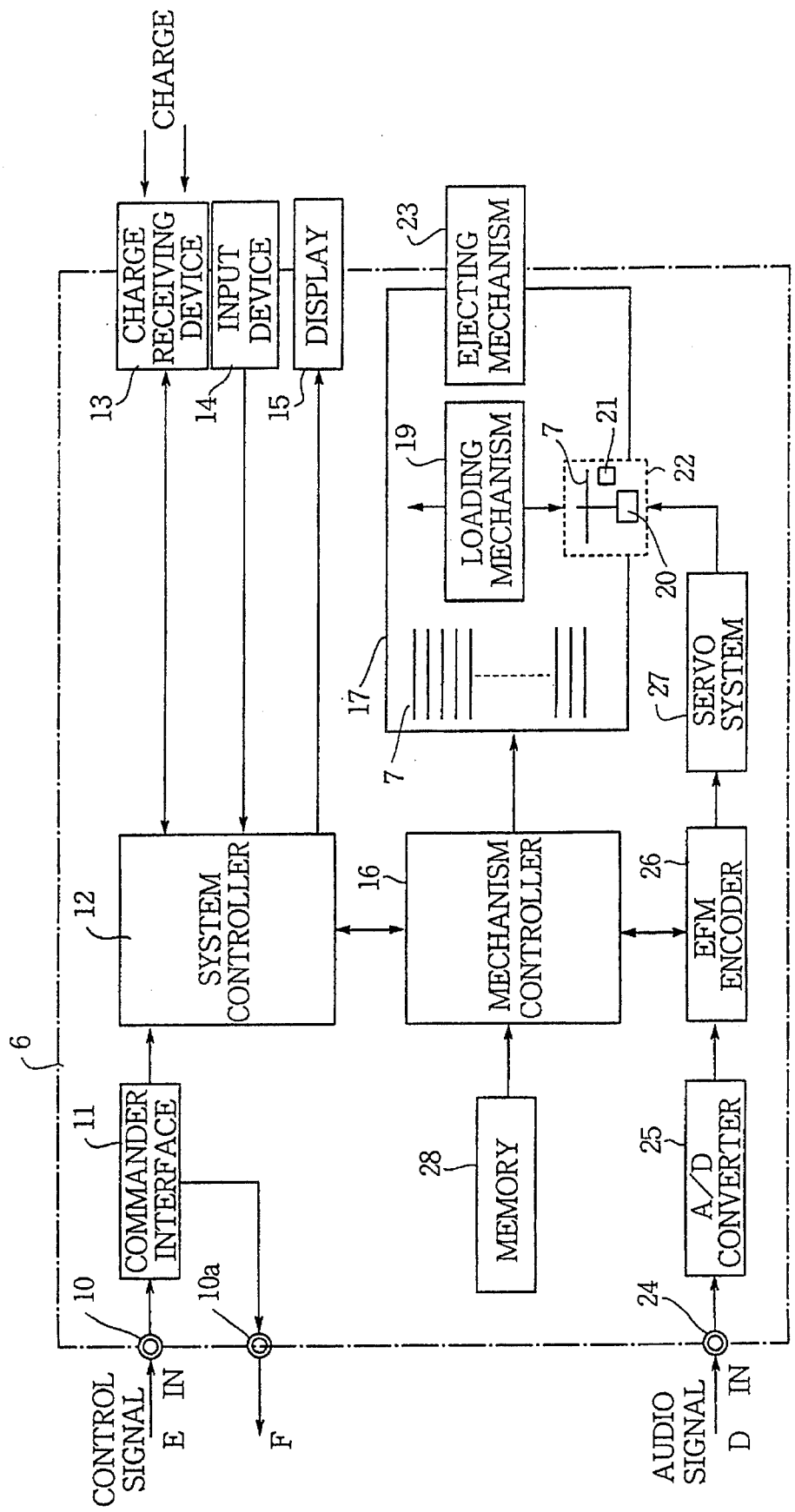
FIG. 2 is a block diagram showing the CD-R recorder of FIG. 1.

Referring to FIG. 2, the CD-R recorder 6 is applied with a control signal E from the singalong disc player 3 through an input terminal 10. The input terminal 10 is, for example a DIN-SUB9P terminal, connected to the singalong disc player 3. The control signal E represents information necessary to operate the recorder 6 in accordance with the operation of the disc player 3. Namely, the control signals are, for example, a PLAY signal indicating that a disc is currently played on the disc player 3, REM signal for remote controlling the recorder 6.

The control signals are fed to a system controller 12 through a commander interface 11. The system controller 12 is further applied with output signals of a charge receiving device 13 and an input device 14. When the input device 14 is operated to record the audio signal on a CD-R 7, the system controller 12 applies a signal to a display 15 to indicate necessary information for recording in accordance with the output signals of the charge receiving device 13. The controller 12 further applies a signal to a mechanism controller 16 to control the recording operation. The mechanism controller 16 is provided with a memory 28 for storing information to be recorded on the CD-R such as addresses of the CD-R where the recording of the audio signal starts.

The system controller 12 applies a control signal F to the disc player 3 through the commander interface 11 and an output terminal 10 so as to operate the disc player 3 when the CD-R recorder 6 is ready for a recording operation.

The CD-R recorder 6 further has an input terminal 24 to which the mixed audio signal of the vocal and instrumental parts of a song is fed from the disc player 3. The audio signal is fed to an eight to fourteen modulation (EFM) encoder 26 through an A/D converter 25. The EFM endcoder 26 converts the digital audio signal into digital modulation codes enabling the audio signal to be recorded on the CD-R.

The output signal of the EFM encoder 26 is fed to a recording section 22 in a recording device 17 through a servo system 27. The recording section 22 comprises the recording head 21 and a spindle motor 20 for rotating the CD-R 7. The servo system comprises a spindle servo system for controlling the spindle motor 20, focusing servo system, slider servo system, and track-following servo system, each of which is for controlling the recording head 21.

The recording device 17 stores a plurality of unrecorded CD-Rs 7. A loading mechanism 19 controlled in accordance with a signal from the mechanism controller 16 transfers one of the CD-Rs to a turntable (not shown) provided in the recording section 22. The coded audio data from the EFM encoder 26 is written on the CD-R 7 by the recording head 21. Thereafter, the loading mechanism 19 transfers the recorded CD-R 7 toward an ejecting mechanism 23 which ejects the disc out of the recording device 17 in accordance with a signal from the mechanism controller 16.

Briefly describing the operation of the present invention, a user of the singalong disc player 3 selects a plurality of songs which he desires to sing. In order to record the singer's voice on the CD-R 7, the user inserts coins, token money or bills in the charge receiving device 13 of the CD-R recorder 6. If the recorder 6 is in an automatic recording mode, where the selected songs are automatically recorded when sung, a PLAY key is depressed. The CD-R recorder 6 may be adapted to distribute recorded CD-Rs free of charge, in the case of which the user operates the input device 14 for recording. When the PLAY signal is fed from the disc player 3, the system controller 12 starts the operation for recording the audio signal D. After the recording is completed, the recorded CD-R 7 is finalized, that is information representing a table of contents (TOC) is recorded in a specified area of the CD-R and ejected out of the CD-R recorder 6 through the ejecting mechanism 23.

In some cases, the singer after the start of his singing may want to restart at the beginning of the song or altogether start with another song. The singer operates a restart key to restart the same song, or operates a reselect key to select a new song. The disc player 3 accordingly applies a control signal to the CD-R recorder 6, thereby to stop the recording and to record that the heretofore recorded area is an unnecessary area.

The disc player 3 searches the starting position of the song for the restart. Meanwhile, the recording head 21 of the CD-R recorder 6 awaits at the position where the recording is stopped and the addresses indicating the unnecessary area are stored in the memory 28. When the disc player 3 is operated again, the CD-R recorder 6 records the audio signal D until the end of the song. When the CD-R is finalized, the addresses of the unnecessary area are derived from the memory 28 and written on the CD-R so as to skip the unnecessary area when reproducing the CD-R. Thus, although the unnecessary area remains on the disc, when reproducing the recorded CD-R, the area is skipped so that the reproduction of the erroneous audio signal is avoided.

Figure 3:
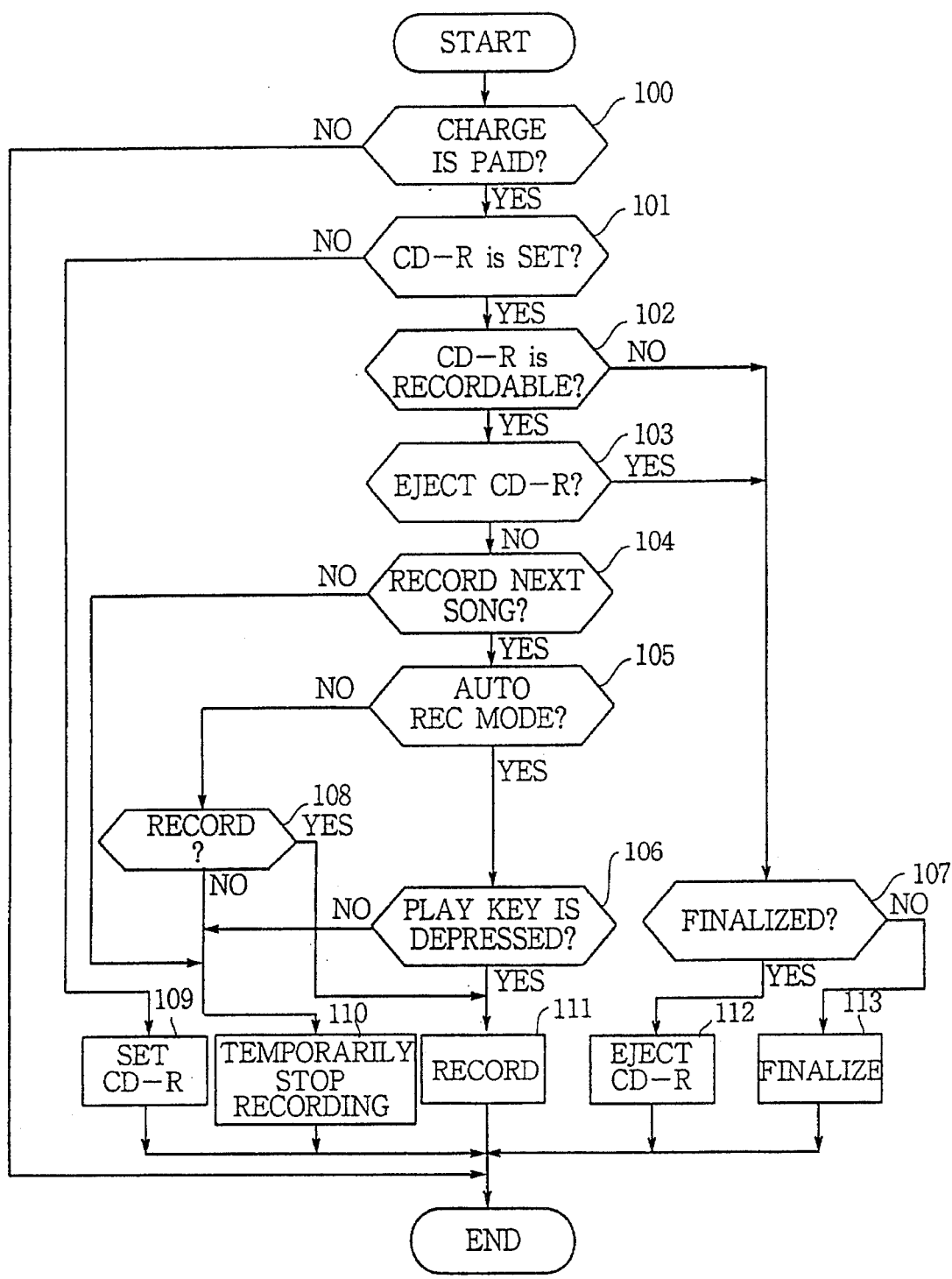
FIG. 3 is a flowchart describing the operation of the CD-R recorder.

The operations of the CD-R recorder 6 is described in detail with reference to the flowchart of FIG. 3. The routine is repeated at a predetermined interval.

At a step 100, it is determined that the charge is paid. When a CD-R 7 is not yet set at a recording position of the recording section 22 in the recording device 17, the program goes from a step 101 to a step 109 where the loading mechanism 19 of the recording device 6 is operated. After the disc 7 is set at the recording position, it is determined whether the set CD-R 7 is recordable at a step 102, that is, whether the CD-R has an empty space where data can be written, or the space is full so that the data cannot be recorded any more.

If the CD-R is still recordable, the program goes to a step 103 where it is determined whether the user has instructed to stop the recording and eject the CD-R out of the recorder 6 as described hereinafter. When continuing the recording, the program proceeds to a step 104 where it is determined that the next song selected at the singalong disc player 3 is to be recorded. If the song is to be recorded, in the automatic recording mode, the program goes from a step 105 to a step 106 where it is confirmed that the PLAY key is depressed.

In a manual recording mode, the program proceeds to a step 108 from the step 105. The user operates the input device 14 before recording each song. The recording is temporarily stopped (step 110) if the input device 14 is not operated to record a desired song at the step 108.

Thereafter, the program goes from the step 106 or the step 108 to a step 111 where the audio signal fed from the singalong disc player 3 through the input terminal 24 is recorded on the CD-R 7.

The operation is repeated until all of the selected songs are recorded. If the user does not desire to record the next song, the program goes from the step 104 to the step 110, thereby temporarily stopping the recording.

In order to end the recording, the input device 14 is operated to compulsorily eject the recorded CD-R 7. Hence the program goes from the step 103 to a step 107 where it is determined whether the CD-R is finalized, that is a process for completing the recording has been executed. If not, the CD-R is finalized at a step 113, and thereafter, the loading mechanism 19 carries the CD-R to the ejecting mechanism 23, thereby ejecting the CD-R out of the CD-R recorder 6 at a step 112.

If the CD-R set at the recording portion is full and can no longer store data, the program goes from the step 102 to step 107.

Figure 4:
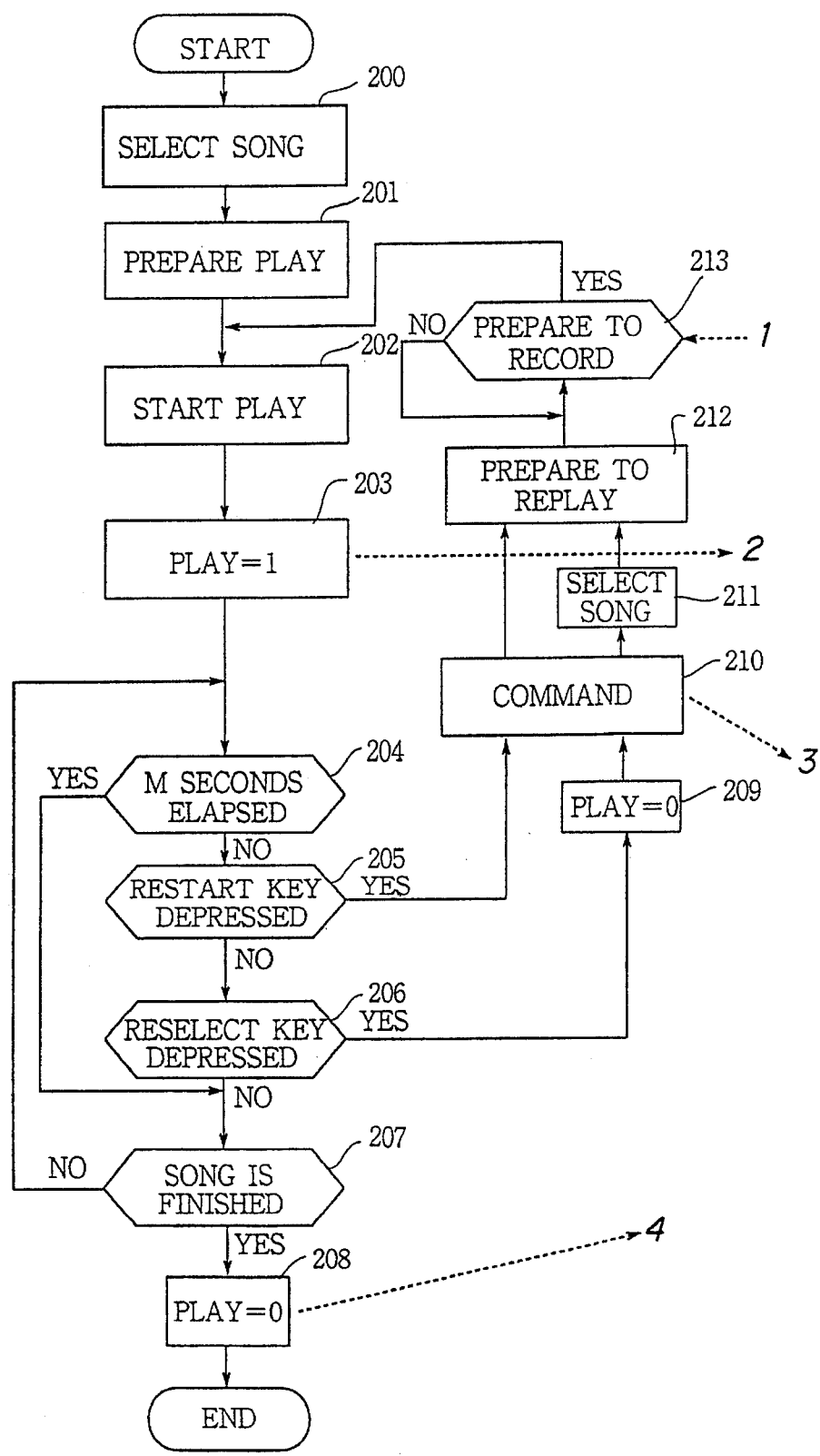
FIGS. 4a and 4b are a flowchart describing a detailed recording operation.
Figure 4:
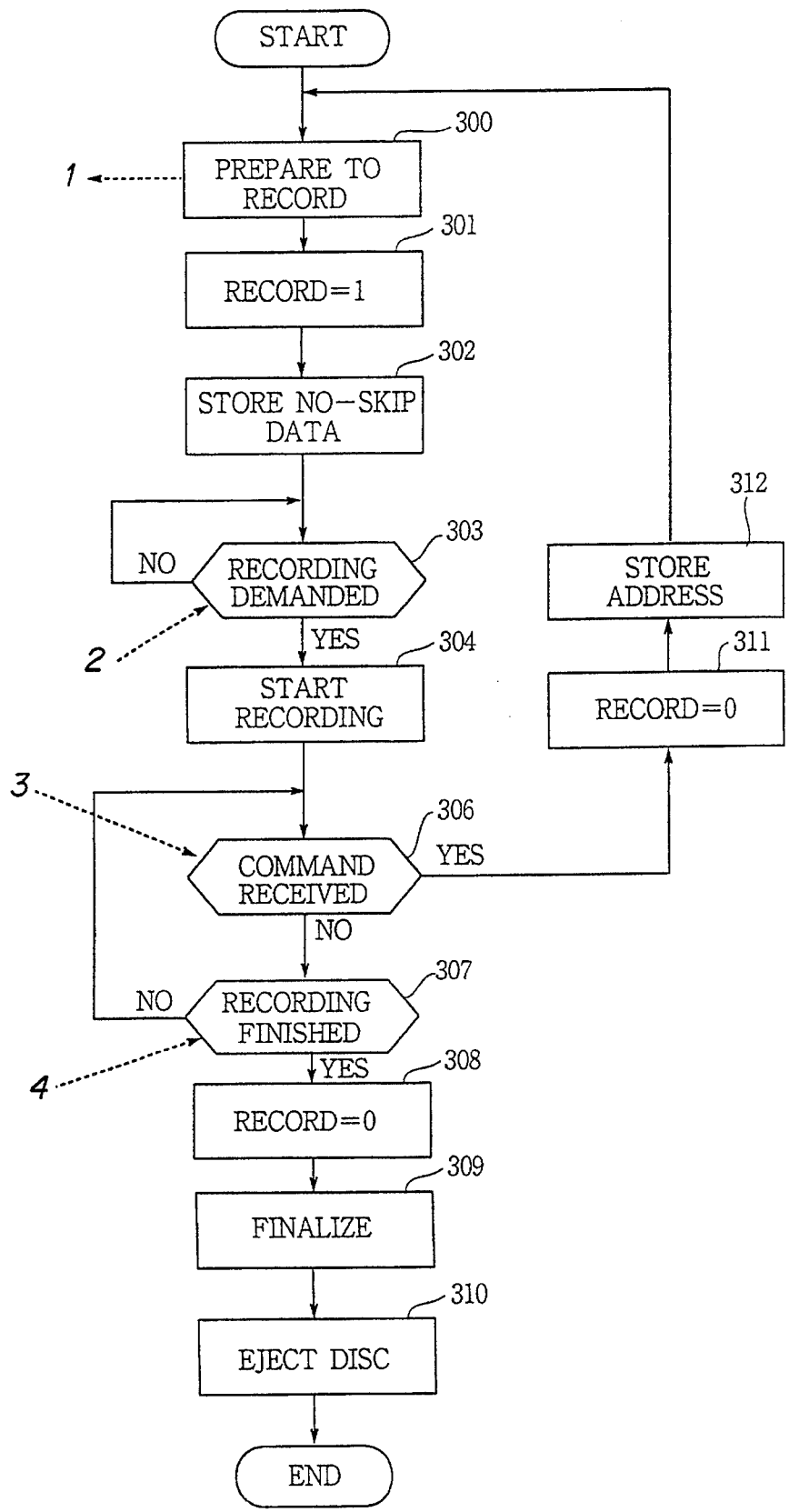

The detailed operations of the disc player 3 and the CD-R recorder 6 in cooperation with each other will be described hereinafter with reference to FIGS. 4a and 4b. FIG. 4a shows the operation of the disc player 3, and FIG. 4b shows the operation of the CD-R recorder 6.

Referring to FIG. 4b, at a step 300, a preparation for recording is carried out, namely, the CD-R is delivered by the loading mechanism 19 and set at the recording position. The user operates the keys of the disc player 3 to select the songs to sing and depresses a RECORD key of the CD-R recorder 6, thereby setting a RECORD flag at a step 301. At a step 302, no skip data indicating that no skipping is performed is recorded in the memory 28.

Meanwhile, at a step 200 of FIG. 4a, a song to be sung is selected, and at a step 201 a preparation for the reproducing a disc storing accompaniment for the song is made. At a step 202, the player start to play the selected disc of the song. At a step 203, a PLAY flag indicating that the disc player 3 has started to play is set. At the same time, the PLAY signal as the control signal E is fed to the CD-R recorder 6 as shown by the dotted line. Accordingly, at a step 303, it is determined that the recording is demanded. As a result, the recording starts at a step 304.

The disc player 3 keeps count of the time from the start to the end of the reproduction of the disc for the song. When m seconds have passed without the singer operating other keys, the program jumps from a step 204 to a step 207. The steps 204 and 207 are repeated until the song is finished.

Namely, m seconds is a length of time within which the singer may restart the singing and still automatically operate the CD-R recorder 6. The operation when the user presses a RESTART key within m seconds at a step 205, or a RESELECT key for selecting another song at a step 206 will be later described.

When it is determined that the song is finished at the step 207, the PLAY flag set at the step 203 is reset. The C-DOWN signal is accordingly applied to the CD-R recorder 6 as the control signal E to stop the recording. Accordingly, it is determined at a step 307 of FIG. 4b that the recording is to be finished. Thereafter, the program goes to a step 308 where the RECORD flag is reset, thereby stopping the recording. The CD-R is finalized at a step 309 in accordance with the information stored in the memory 28. That is to say, since there is no need to skip the tracks in the present routine, information only on TOC is written on the CD-R. The CD-R is then ejected out of the CD-R recorder 6 at a step 310.

When such a CD-R 7 is played, since there is no unnecessary areas thereon, all of the recorded tracks are reproduced from the start.

If the RESTART key is depressed within m seconds, the program goes from the step 205 to a step 210. If the RESELECT key is depressed within m seconds, the program goes from the step 206 to the step 210 through a step 209, where the PLAY flag is reset. At the step 210, a command signal for instructing the CD-R recorder to restart the recording is fed to the recorder 6 as the control signal E. The CD-R recorder 6 in response to the command signal resets the RECORD key to temporarily stop the recording at a step 311. The recording head of the recorder 6 is maintained at the present position. The address of the unnecessary area is stored in the memory 28 at a step 312 for skipping the area. Thereafter, the program for the CD-R recorder 6 returns to the step 300. When the CD-R recorder 6 is ready to record, a recording preparation signal as the control signal F is fed to the disc player 3.

Meanwhile, the program for the disc player 3 goes from the step 210 to a step 212, directly if the same song is to be restarted, or through a step 211 where another a song is reselected. At the step 212, the preparation for replaying the disc on the disc player 3 is made. In accordance with the control signal F from the CD-R recorder 6, the program proceeds from a step 213 to the step 202. The program through the steps 202 to 208 is carried out in the same manner as described hereinbefore. The CD-R recorder 6 accordingly executes the steps 303 to 310.

When such a recorded CD-R is played, the pickup of a player skips the unnecessary area designated by the addresses stored in the CD-R. Thus, erroneous audio signal is not reproduced.

If the singer wishes to restart the recording over again, the steps 202 to 213 in FIG. 4a and steps 311 and 312 in FIG. 4b may be repeated. However, in consideration to the recording capacity of the usually employed eight-centimeter CD, the number of cancellation should be restricted. More particularly, it is preferable to add a step in one of the procedures from the steps 205 to 210, from steps 206 to 209, and from steps 306 to 311. Alternatively, a step for indicating a warning may be provided.

The operation of the present invention may be modified to feed the control signals from either one of the disc player 3 and CD-R recorder 6 to the other.

From the foregoing, it will be understood that the present invention provides a recording system for a write-once CD wherein addresses of an area where erroneous information is recorded is stored in the CD, so that the area may be skipped when playing the CD. Thus, when recording songs, discharging the CD having errors and loading a new CD are obviated.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A recording system having a recording device for recording information fed from a singalong disc player on a recordable disc, said system comprising:

starting means responsive to a start signal applied by a user of the system for starting a recording of information;

detector means for detecting a rerecording command applied by the user for rerecording information on the recordable disc and for producing a rerecording signal;

stopping means responsive to the rerecording signal for stopping the recording of information;

storing means for storing an address of a recorded area of the disc in a memory as an unnecessary area after recording has been stopped by the stopping means;

said starting means being responsive to a restart signal based on completion of the storing of an address for restart to record the information from an end of said unnecessary area;

finalizing means, when the rerecording has been finished, for finalizing the recordable disc such that the unnecessary area is not reproduced thereafter based on the stored address thereof.

2. The system according to claim 1 wherein
   the finalizing means is provided so as to skip the unnecessary area.

3. The system according to claim 1 further comprising commanding means responsive to the rerecording signal for applying a command to the singalong disc player for searching a starting position of a song to be played.

4. The system according to claim 3, wherein said starting means starts to record when the searching of the starting position finishes and starting of reproduction of the song is detected.

5. The system according to claim 1, further comprising counter means for counting the number of rerecording, and warning means for displaying a warning when the counting number reaches a predetermined number.

* * * * *